2 Sheets, Sheet 2.
Sands & Cummings,
Brick Machine.
Nº 10,005.          Patented Sep. 6, 1853.
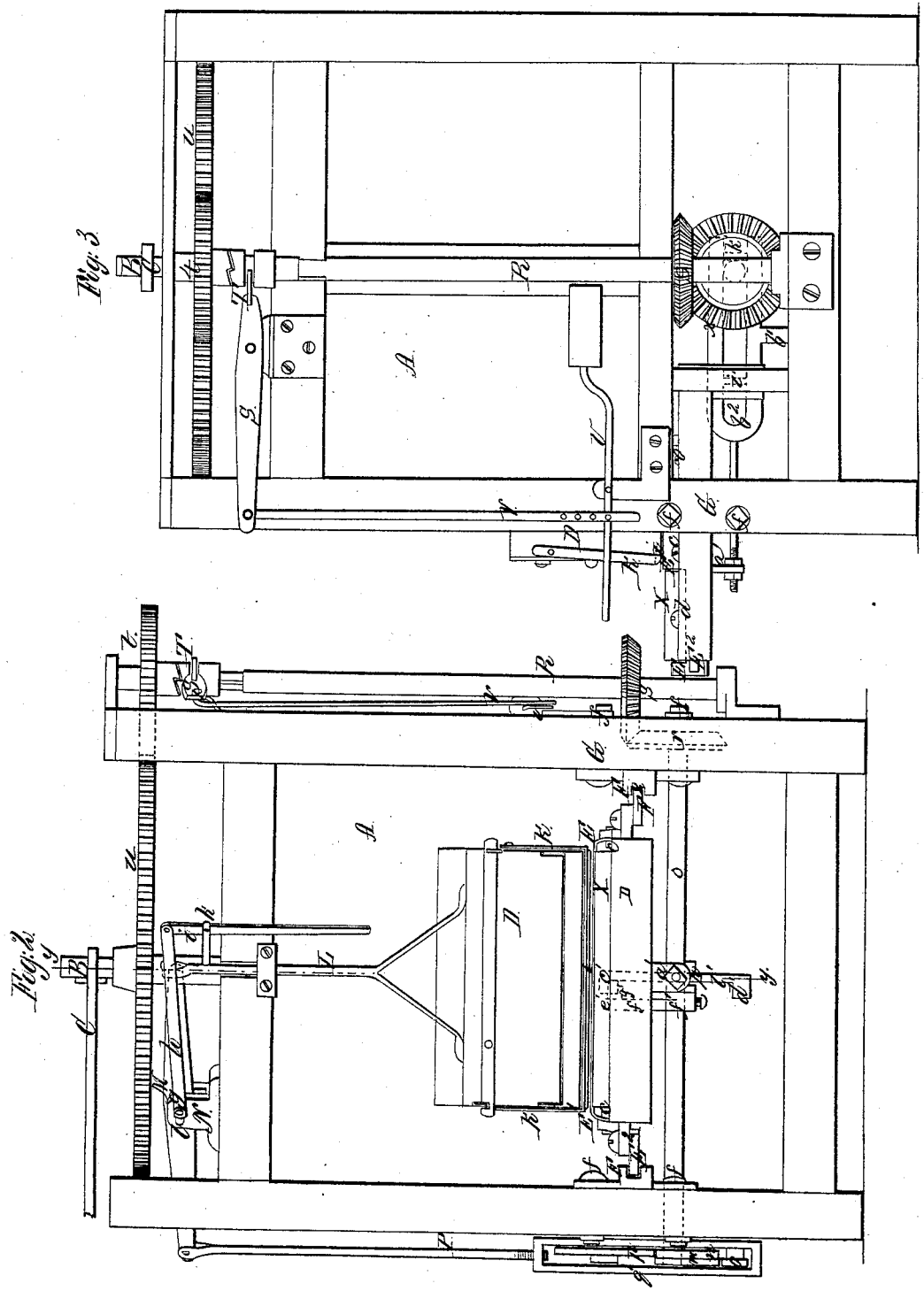

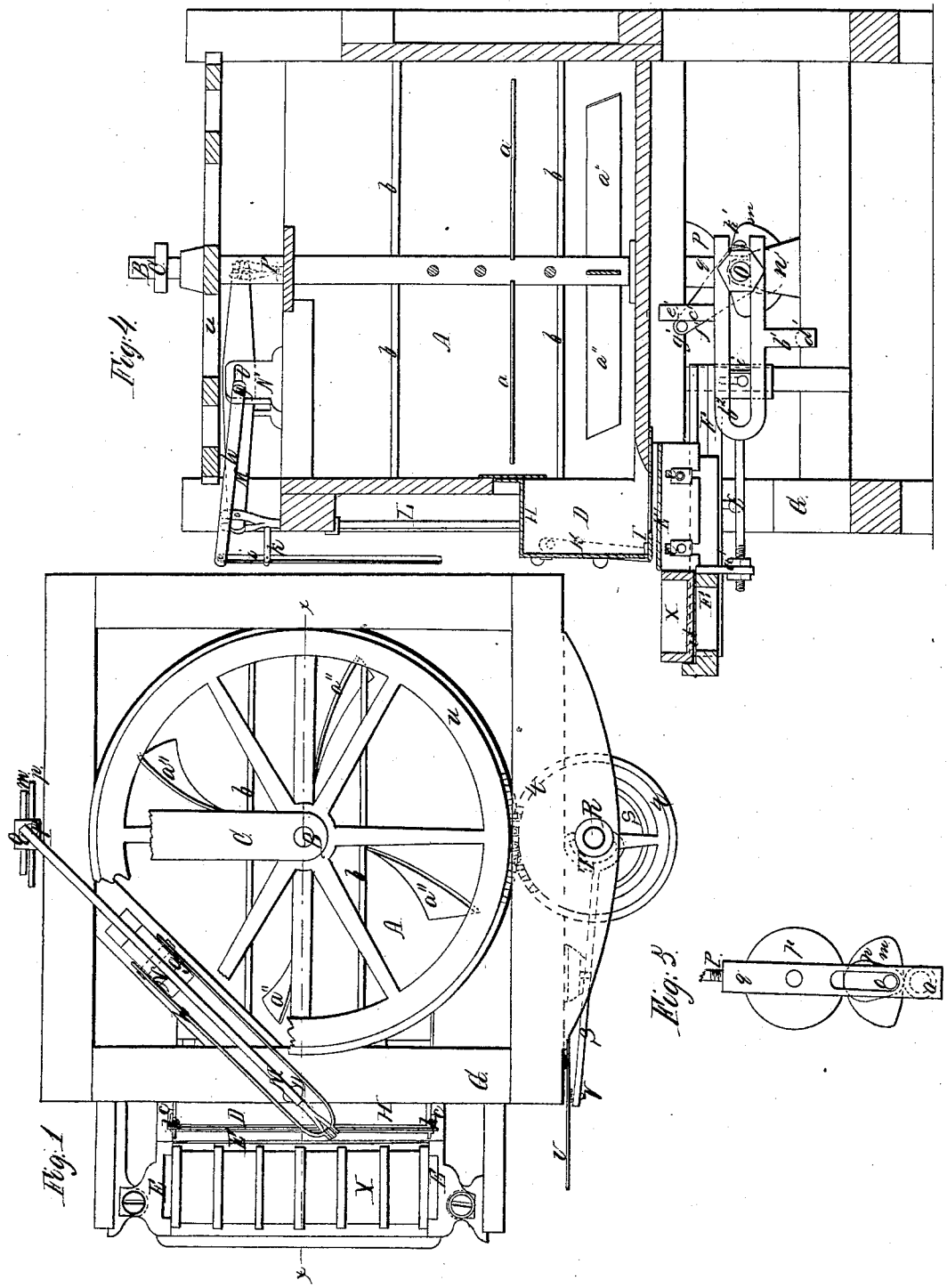

UNITED STATES PATENT OFFICE.

HIRAM SANDS, OF CAMBRIDGE, MASSACHUSETTS, AND GARY CUMMINGS, OF WEST DERBY, VERMONT.

BRICK-MACHINE.

Specification of Letters Patent No. 10,005, dated September 6, 1853.

*To all whom it may concern:*

Be it known that we, HIRAM SANDS, of Cambridge, in the State of Massachusetts, and GARY CUMMINGS, of West Derby, Vermont, have invented certain new and useful Improvements in Machinery for Tempering Clay and Pressing or Converting It into Bricks; and we do hereby declare that the same are fully described and represented in the following specification and the accompanying drawings, letters, figures, and references thereof.

Of the said drawings, Figure 1 denotes a top view of our improved brick press. Fig. 2 is a front elevation of it. Fig. 3 is a side elevation, and Fig. 4, is a vertical section taken upon the line $x\ x$ of Fig. 1 and $y\ y$ of Fig. 2 so as to represent the machinery for moving the mold carriage.

In the said drawings, A denotes the pug mill reservoir, into which the clay is received and tempered.

B is the vertical shaft thereof, which passes up through the center of the reservoir, and is rotated by a horse or animal applied to a brake or lever C extended horizontally from its upper end. Arms, $a, a$ extend from the shaft B, and work in connection with cross bars $b, b$, extended across the interior of the reservoir.

The mold charger D opens out of the lower part of the reservoir, and is connected with one side of it, the clay being thrown into it by the revolution of the arms $a'', a''$, and its own gravity.

E is the mold carriage which operates in connection with the mold charger. It carries a movable platform or plate E' which is so applied to it by adjusting screws and slots, as seen at $c, c$, as to enable it to be elevated or depressed with respect to the surface $d$ on which the mold rests on the carriage. The said carriage has supporting slides $E^2$, $E^2$, which rest and slide respectively in ways F, F, which are so fastened to the framework G of the machine, by adjusting screws or contrivances as seen at $f\ f$, as to be capable of being elevated or depressed in order to bring the surface $d$ of the mold carriage nearer to or farther from the level of the lower part of the mold carriage as circumstances may render necessary. The object of the above is to adapt the platform E' and the surface $d$ to the mold charger and a mold of any required thickness.

Within the mold charger is a piston H, which is raised up and down in order to force the clay out of the bottom orifices of the charger and into the brick mold, when it is brought directly underneath the charger.

The lower part of the charger has a portion I of its front made movable, and supported on vibrating arms K, K, which are suspended at their upper ends on pins, so as to be capable of being moved outward. Should any stone or piece of brick extend above the mold, after the clay has been pressed into it, it will be carried against the part or mold protector I, when the mold moves from under the charger; and the mold protector will yield or move outward with it, and thus prevent its injuring the mold or the charger.

The mold protector forms part of the floor of the charger, and is made wider than it is deep in order to prevent the pressure on the clay from forcing it outward so as to allow the clay to be improperly ejected from the charger.

The piston is attached to a rod L that is jointed to the front end of a lever M arranged as seen in the drawings. This lever passes through a slotted bearing N and has a movable fulcrum, $g$, which is attached to a connecting fork, $h$, worked by a lever $i$ that turns on a fulcrum $k$. The fulcrum $g$ slides in a slot $l$, made through the bearing N and a corresponding one made through the lever. By such means the situation of the fulcrum of the lever can be changed so as to regulate the extent of the depression of the piston for the purpose of causing it so to act with more or less pressure on the clay in the mold as occasion may require.

The lever M is worked up and down, or moved on its fulcrum in order to move the piston, and to hold it stationary at the proper periods of time, by means of two cams $m, n$, fixed on the horizontal shaft O. These cams act respectively against rollers or wheels $o, p$, fixed in a frame $q$, attached to the lower end of the connecting rod P, that is jointed to the lever M.

A side view of the frame $q$, and the cams and rollers is given in Fig. 5,—the frame $q$ being made to slide on the shaft. The said shaft O is connected at its other end with a vertical shaft R, by two bevel gears $r, s$. On the upper part of the shaft R, there is a spur gear $t$, that runs loosely on the shaft, and works into a larger gear $u$ fixed on the shaft of the pug mill. To the gear $t$ and the shaft R and a lever S a suitable clutch T is adapted so as to enable a person by pulling downward the front arm of the lever to clutch the gear to the shaft. The said lever is connected with a weighted hand lever U by means of a connecting rod V, joined to them respectively, the whole being arranged as seen in the drawings.

The hand lever is placed in a convenient position for the offbearer or bearers of the machine to lay hold of it and work it as occasion may require.

The mold carriage is not only to be moved back and forth, so as to carry a mold laid on its surface $d$, underneath and out from the charger, but it is to be suffered to remain at rest long enough not only to permit the clay to be forced into the mold, but subsequently long enough to permit the mold to be removed from the carriage, emptied and replaced thereon. Beside this it is to be stopped in its movements, just in the proper positions, when entirely under the mold, or entirely out from underneath it. The machinery which effects this purpose consists of a pitman $a'$ affixed to the carriage, and fork $b^2$ that straddles, rests and moves on the shaft O. From this fork two arms $b'$, $c'$, extend as seen in the drawings, each arm being provided with a stud or projection $d'$ or $c'$ extended from its side and at its outer end. There is an arm $f'$ fixed on the shaft O, and having a stud $g'$ that projects from its side, and alternately (when the shaft O is revolved) strikes against the two studs $d'$ $e'$ and so as to first move the mold carriage in one direction, and next move it back again. After passing against, and by each stud, a short time elapses before it is carried into contact with the other stud, the same being to enable the carriage to remain at rest such time, the movement of the carriage being arrested by the bringing up against the shaft O, of one of the two pins $i'$, $k'$ that extend down through the fork as seen in the drawings. The mold is seen at X and is represented in red lines.

In the construction of our machine we have studied simplicity in its parts, and in their operation, and particularly in those which move the mold charger. In some respects they are like other mechanism in use for giving an intermittent reciprocating rectilinear motion, but they differ in others.

We do not claim the mode of operating the mold carriage by means of a crank acting upon bars running across or attached to the mold carriage, as that has been employed before in the brick machine of James Dane, patented Oct. 24, 1848; nor do we claim the mode of operating the pressing piston by means of a lever actuated by revolving cams and connecting rod; nor do we claim the arrangement thereof with the cam shaft made to pass beneath the pug mill and these operate the mold carriage by means of a reversing gear applied to said shaft, as the like arrangement is contained in the patent of Dane, Healy and Cummings, Aug. 5, 1851, ante-dated June 17, 1851; but What we do claim is—

1. The modification of such arrangement by substituting for the shaft with reversing gear, the shaft with continuous motion, operating the carriage and producing the intervals of rest by means of the crank pin acting alternately upon the studs $d'$ and $e'$ connected with the mold carriage; whereby we obtain greater certainty and precision of action in the machine, with greater simplicity and durability.

2. Also, in combination with the piston and the lever M we claim the slot in the lever, the slotted bearings, and the movable fulcrum pin, the connecting fork and hand lever, the same being for the purpose of increasing or diminishing the amount of pressure of the piston on the clay in the mold, as specified.

In testimony whereof we have hereto set our signatures this twenty sixth day of November, A. D. 1852.

HIRAM SANDS.
GARY CUMMINGS.

Witnesses as to the signature of Hiram Sands:
F. P. HALE, Jr.,
GEO. PATTEN.

Witnesses as to the signature of Gary Cummings:
JOHN MORAN,
GEORGE W. BOOTHE.